United States Patent [19]
Rumer et al.

[11] Patent Number: 5,883,893
[45] Date of Patent: Mar. 16, 1999

[54] ATM VOICE TRANSPORT PROTOCOL

[75] Inventors: Mark Rumer, Santa Barbara; Michael D. Savini, San Jose, both of Calif.

[73] Assignee: Cisco Technology, Inc., San Jose, Calif.

[21] Appl. No.: 711,531

[22] Filed: Sep. 10, 1996

[51] Int. Cl.⁶ ........................................ H04J 3/24
[52] U.S. Cl. .................. 370/395; 370/469; 370/474; 370/496
[58] Field of Search .................. 370/395, 469, 370/474, 465, 466, 467, 496

[56] References Cited

U.S. PATENT DOCUMENTS

| | | | |
|---|---|---|---|
| 5,379,293 | 1/1995 | Kanno et al. | 370/474 |
| 5,452,293 | 9/1995 | Wilkinson et al. | 370/395 |
| 5,459,722 | 10/1995 | Sherif | 370/474 |
| 5,699,369 | 12/1997 | Guha | 371/41 |

*Primary Examiner*—Chi H. Pham
*Assistant Examiner*—Ricky Q. Ngo
*Attorney, Agent, or Firm*—Blakely Sokoloff Taylor & Zafman, LLP

[57] ABSTRACT

A transport layer protocol for a compressed voice, facsimile and modem data includes a voice packetization sublayer; a voice transport sublayer; and a voice payload segmentation and reassembly sublayer. The voice payload segmentation and reassembly sublayer breaks up user data packets into segments. Each segment includes a header and a payload data unit. Voice data segments have payloads made up of voice data. Signaling payloads are made up of op codes, which define the type of signaling message, and related operands.

12 Claims, 10 Drawing Sheets

| | Voice, fax, modem | User action | Configuration, NMS |
|---|---|---|---|
| Application layer | Voice coder, fax relay, modem relay, in-band signaling (quiescent state) etc. | CAS type signaling (E&M, etc.), background noise estimate, in-band signaling (call set-up state), status | Configuration specific signaling (addressing, coders, etc.) |
| VTP layer | Voice Packetization | Best effort protocol | Signaling Negotiation Protocol |
| | Voice Transport | Signaling Transport | |
| | Voice Payload segmentation/ reassembly | Signaling payload segmentation/ reassembly | |
| Link layer | Adaptation sub-layer (E.g.:AAL-x) Link Layer (E.g.:ATM) | | (E.g.:Frame-Relay) |
| | Physical | | |

| | | | |
|---|---|---|---|
| Voice, fax, modem | | User action | Configuration, NMS |
| Voice coder, fax relay, modem relay, in-band signaling (quiescent state) etc. | | CAS type signaling (E&M, etc.), background noise estimate, in-band signaling (call set-up state), status | Configuration specific signaling (addressing, coders, etc.) |
| Voice Packetization | | Best effort protocol | Signaling Negotiation Protocol |
| Voice Transport | | Signaling Transport | |
| Voice Payload segmentation/ reassembly | | Signaling payload segmentation/ reassembly | |
| Adaptation sub-layer | (E.g.:AAL-x) | | |
| Link Layer | (E.g.:ATM) | | (E.g.:Frame-Relay) |
| Physical | | | |

Application layer | Voice, fax, modem / User action / Configuration, NMS
VTP layer | Voice Transport / Signaling Transport
Link layer

Fig. 2

| | 8 | 7 | 6 | 5 | 4 | 3 | 2 | 1 | 66 ↙ |
|---|---|---|---|---|---|---|---|---|---|
| Opcode | 0 | 0 | 0 | 0 | 0 | 0 | 1 | 1 | Octet 3 |
| Operand | Desired coding type requested ||||||||  Octet 4 |

Fig. 9

| | 8 | 7 | 6 | 5 | 4 | 3 | 2 | 1 | 68 ↙ |
|---|---|---|---|---|---|---|---|---|---|
| Opcode | 0 | 0 | 0 | 0 | 0 | 1 | 0 | 0 | Octet 3 |
| Operand | Desired coding type requested 69 |||||||| Octet 4 |

Fig. 10

| | 8 | 7 | 6 | 5 | 4 | 3 | 2 | 1 | 70 ↙ |
|---|---|---|---|---|---|---|---|---|---|
| Opcode | 0 | 0 | 0 | 0 | 1 | 0 | 0 | 0 | Octet 3 |
| Operand | Relative transition time 72 |||||||| Octet 4 |
| | Signaling conditioning type 74 |||||||| Octet 5 |
| | VAQ 76 | Orig. 78 | Spare || Dial digit conditioning type 80 |||| Octet 6 |
| | Voice coding type 82 |||||||| Octet 7 |
| | Noise amplitude 84 |||| A | B | C | D | Octet 8 (86) |
| | In-band signaling condition 88 |||||||| Octet 9 |

Fig. 11

| | 8 | 7 | 6 | 5 | 4 | 3 | 2 | 1 | 90 ↙ |
|---|---|---|---|---|---|---|---|---|---|
| Opcode | 0 | 0 | 0 | 0 | 1 | 0 | 1 | 0 | Octet 3 |
| Operand | Dial digit code |||||||| Octet 4 |
| | Dial digit code... |||||||| Octet 5 |

Fig. 12

|          | 8 | 7 | 6 | 5 | 4 | 3 | 2 | 1 |         |
|----------|---|---|---|---|---|---|---|---|---------|
| Opcode   | 0 | 0 | 0 | 0 | 1 | 0 | 1 | 1 | Octet 3 |
| Operand  | Dial digit code                | Octet 4 |
|          | Dial digit code...             | Octet 5... |

Fig.13

|          | 8 | 7 | 6 | 5 | 4 | 3 | 2 | 1 |         |
|----------|---|---|---|---|---|---|---|---|---------|
| Opcode   | 0 | 0 | 0 | 0 | 1 | 1 | 0 | 0 | Octet 3 |

Fig.14

|          | 8 | 7 | 6 | 5 | 4 | 3 | 2 | 1 |         |
|----------|---|---|---|---|---|---|---|---|---------|
| Opcode   | 0 | 0 | 0 | 0 | 1 | 1 | 0 | 1 | Octet 3 |

Fig.15

|          | 8 | 7 | 6 | 5 | 4 | 3 | 2 | 1 |         |
|----------|---|---|---|---|---|---|---|---|---------|
| Opcode   | 0 | 0 | 0 | 0 | 1 | 1 | 1 | 0 | Octet 3 |
| Operand  | Tone segment duration (in 25ms increments) | Octet 4 |
|          | Tone 1 frequency MSb (f in Hz) | Octet 5 |
|          | Tone 1 frequency LSb | Tone 2 frequency MSb | Octet 6 |
|          | Tone 2 frequency LSb (f in Hz) | Octet 7 |
|          | Tone 1 attenuation from 0dBm0 (in .25dB increments), 0= tone off | Octet 8 |
|          | Tone 2 attenuation from 0dBm0 (in .25dB increments), 0= tone off | Octet 9 |

Fig.16

ATM VOICE TRANSPORT PROTOCOL

FIELD OF THE INVENTION

The present invention relates generally to the field of cell switching network communications and, more specifically, to the efficient transport of compressed voice, facsimile and modem data across such a network.

BACKGROUND

The desire to integrate data, voice, image and video over high speed digital trunks has led to the development of a packet switching technique called cell relay or asynchronous transfer mode (ATM). ATM traffic is switched and multiplexed in fixed length cells and an ATM network typically provides a number of interconnected nodes which are capable of receiving data from other network nodes and forwarding that data through to other network nodes to its ultimate destination. Nodes are interconnected by transmission paths, each of which supports one or more virtual paths. Each virtual path contains one or more virtual channels. Switching can be performed at the transmission path, virtual path or virtual channel level.

Existing packetized voice formats, such as ITU-T Recommendation G.764 and the Frame Relay Forum's voice over frame relay provide a basic structure for variable bit rate-like voice transport across ATM networks. However, these methods provide no standards for the transport, negotiation of parameters, and/or signaling of legacy telephony using various voice compression techniques. Nor do these methods effectively handle silence compression, signaling or error handling.

SUMMARY AND OBJECTS OF THE INVENTION

It is, therefore, an object of the present invention to provide an improved transport layer protocol for voice, facsimile and modem data transmitted across an ATM network.

This and other objects of the invention are achieved by a voice transport protocol which has the ability to communicate call parameters and signaling related to the set-up of compression algorithms and link verification. The voice transport protocol also supports voice activity detection to minimize bandwidth utilization. In one embodiment, for simple permanent virtual circuit based applications, it provides pinpoint voice transition signaling.

According to one embodiment, a transport layer protocol for a compressed voice is described. The protocol includes a voice packetization sublayer, a voice transport layer sublayer and a voice payload segmentation and reassembly sublayer. The voice payload segmentation and reassembly sublayer breaks up user data packets into segments each made up of a header field and a payload data unit. Voice data segments have payload data units made up of voice data. Signaling segments have payload data units made up of signaling messages. The signal messages are defined by individual op codes and related operands.

The voice transport protocol uses a fixed segment size which does not have to be associated with a lower layer frame size. The voice transport protocol segment length is configurable, however not during a call. Messages or voice data which do not fit this size are segmented at the ingress and reassembled at the egress using a segmentation and reassembly protocol. Voice transport protocol payloads which are smaller than a segment are padded out to a fixed length where it is the link layer's option to carry the padding.

Error detection is provided for signaling and negotiation packets. Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 2 illustrates a voice transport protocol stack according to one embodiment;

FIG. 9 illustrates a Coding Change Message according to one embodiment;

FIG. 10 illustrates a Coding Change Acknowledge Message according to one embodiment;

FIG. 11 illustrates a Status Update Message according to one embodiment;

FIG. 12 illustrates a Dial Digit Forwarding Message according to one embodiment;

FIG. 13 illustrates a Dial Digit Acknowledge Message according to one embodiment;

FIG. 14 illustrates a Dialing Complete Message according to one embodiment;

FIG. 15 illustrates a Dialing Complete Acknowledge Message according to one embodiment;

FIG. 16 illustrates a Call Progress Tone Message according to one embodiment;

DETAILED DESCRIPTION

An improved transport layer protocol for compressed voice, facsimile and modem data transmitted across an ATM network is described. The voice transport protocol has the ability to communicate call parameters and signaling related to the set-up of compression algorithms, and link verification. It supports voice activity detection to minimize bandwidth utilization. For one embodiment, using permanent virtual circuit based applications, it provides end-point voice transition signaling. Those skilled in the art will appreciate that the voice transport protocol may be considered an adaptation layer specifically designed for handling compressed voice data.

Figure 1:
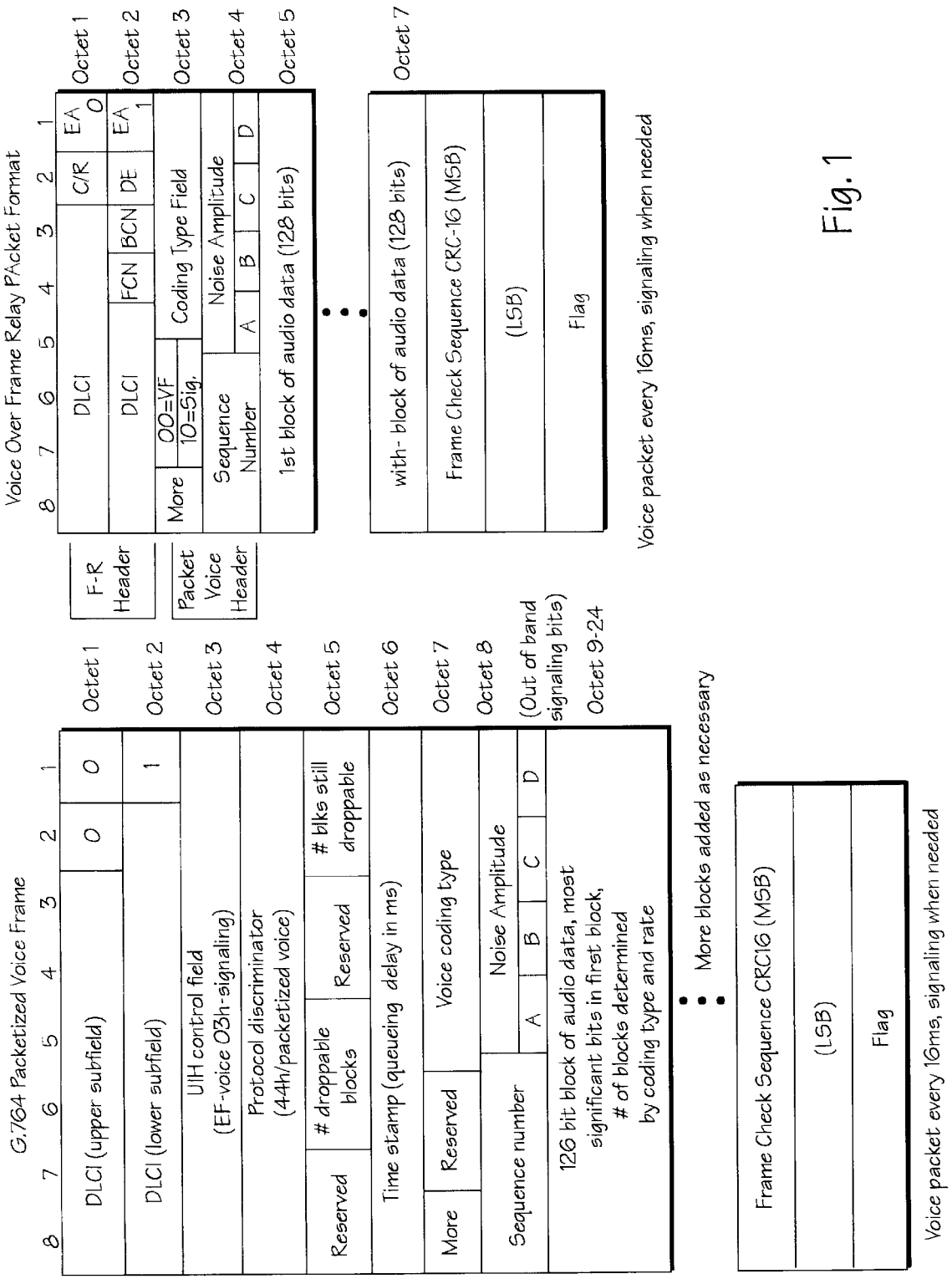
FIG. 1 illustrates ITU-T Recommendation G.764 and Frame Relay Forum voice over frame relay packet formats.

FIG. 1 illustrates existing packetized voice formats, specifically, ITU-T Recommendation G.764 and the Frame Relay Forum's voice over frame relay formats. Each of these formats provide a basic structure for variable bit rate-like voice. With ATM as the target link, conventional wisdom would provide AAL-3/4 or AAL-5 as the segmentation and reassembly layer. However, the resulting overhead would be excessive for slow links. Moreover, neither of these formats adequately provide for the transport, negotiation of parameters, and/or signaling of legacy telephony.

FIG. 2 shows a voice transport protocol stack according to a presently preferred embodiment. The voice transport protocol (VTP) accepts users information (voice or signaling) and packetizes the information as described in detail below. VTP packets are then presented to a link layer for transmission across a packet switching network. Duiing reception, VTP accepts packets from the link layer and reassembles the data or signaling information contained in the packets into user data for presentation to a user application. During communication sessions, VTP operates such that only signaling transitions are passed between node of the communication network. That is, signaling packets are generated and transmitted only when signaling transitions occur.

Figure 3:
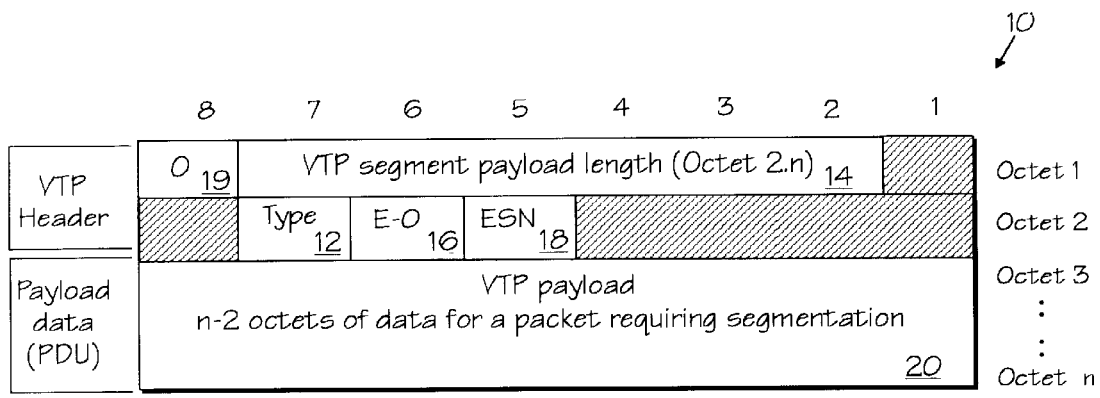
FIG. 3 illustrates the format for a voice transport protocol segment according to one embodiment.
Figure 4:
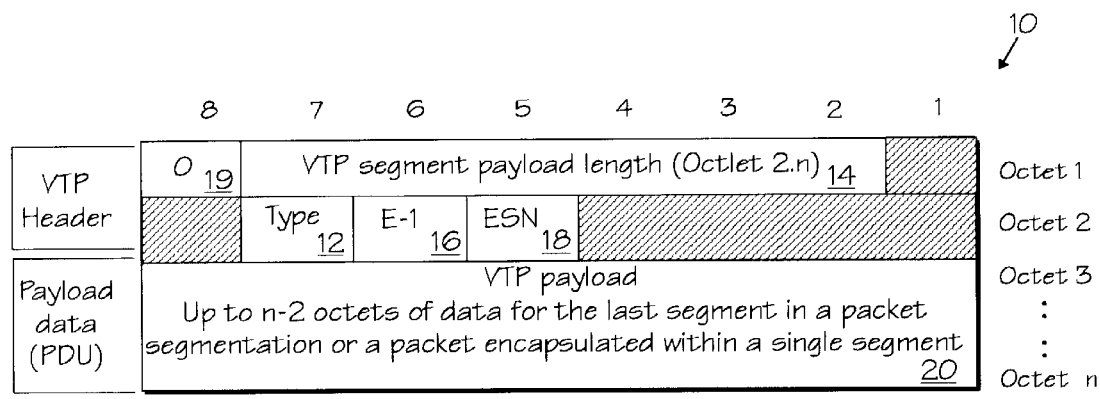
FIG. 4 illustrates a voice transport protocol end segment according to one embodiment.

FIGS. 3 and 4 show the format for a presently preferred voice transport protocol segment 10. Beginning and continuation packets have the format shown in FIG. 3 while end packets have the format shown in FIG. 4. The voice transport protocol segmentation sublayer provides for differentiation between voice and signaling packets, and breaks up/assembles the application packets into/from fixed sized segments (segmentation/reassembly). The segment 10 is made up of a header 19 and a payload 20. A payload-type bit 12 indicates the type of information contained in the remainder of the header 19 and the type of data contained in the payload 20. Payload-type bit 12 may be considered a submux control field. This allows a single virtual connection to support combined voice and signaling data. An alternative would be to transport voice and signaling packets in separate virtual circuits and this alternative is also supported by the voice transport protocol. For a presently preferred embodiment, when the payload-type bit 12 is set to zero, it indicates a voice/fax/modem payload. If the payload-type bit 12 is set to one, it indicates a signaling/negotiation payload.

Packet segmentation is a generic process and applies equally to voice and signaling packets. As a matter of efficiency, most user data packets should fit in the encapsulated voice transport protocol segment 10. Depending on the voice transport protocol segment size, some packets may require segmentation. A typical packet may he 20 bytes According to one embodiment, the voice transport protocol is able to support two sizes of segmented packets, depending on message context. The primary consideration for segment size depends upon the link layer protocol. Of secondary concern are characteristics of the payload. For voice segments, the size of the segment's payload data unit 20 should be as close as possible to an integer multiple of the voice coder block size to achieve the correct balance of link efficiency to payload assembly delay. This may be 20 bytes for one embodiment. For signaling segments, the size of the segment's payload data unit 20 should be the same as or greater than the maximum length message to minimize segmentation overhead. These sizes are determined by the application.

Within the segment header 19, length field 14 contains the number of valid octets within the segment 10 counted from octet 2 to n. Depending on the link layer, the length field 14 may be used as an applications programming interface (API) to the link layer protocol and may be discarded for transport since it would be redundant information. This would be the case for frame relay, ATM AAL-5, etc. It would then be the responsibility of the far-end link layer API to recreate the length field 14 and pass it to the voice transport protocol as expected.

An encapsulation field 16 is used to allow segmentation and reassembly of packets which otherwise will not fit within a segment 10. The context of encapsulation is held for the type of packet segmented. Voice and signaling packets may be segmented concurrently and sent on an interleaved basis. Once segmentation has started for a certain type, a new segmentation for that type cannot be started until the previous segmentation has completed. For a current embodiment, when encapsulation bit 16 is set to zero, it indicates the start or middle of the packet. When encapsulation bit 16 is set to one, it indicates an encapsulated or end of packet. The API to the application must keep track of the total number of payload bytes being segmented or assembled.

An encapsulation sequence number field 18 is updated modulo-two for each voice transport protocol segment 10 sent, the purpose being to detect packet segments 10 lost during transport. The encapsulation sequence number context applies to the type of packet segmented. A gap in encapsulation sequence number, or where the total packet length is less than expected, may be utilized to recover the proper number of bits in a large packet of voice data. This may be useful for data recovery in embedded compression algorithms, or may be used to indicate that the packet should be dropped if less than the expected number of bits is received. A gap in the encapsulation sequence number, where more bits were received than expected, indicates that the packet should be dropped.

A payload field 20 contains voice or signaling packet segment 10 data as further described below. Optional padding allows for formatting a signaling packet to a standard voice transport protocol segment 10 length. Depending on the link, padding may be stripped by its API. The remaining payload header 19 bits (octet 2, bits 8, 4-1) remain constant across all segments 10 generated from a packet and are defined as discussed below.

Figure 5:
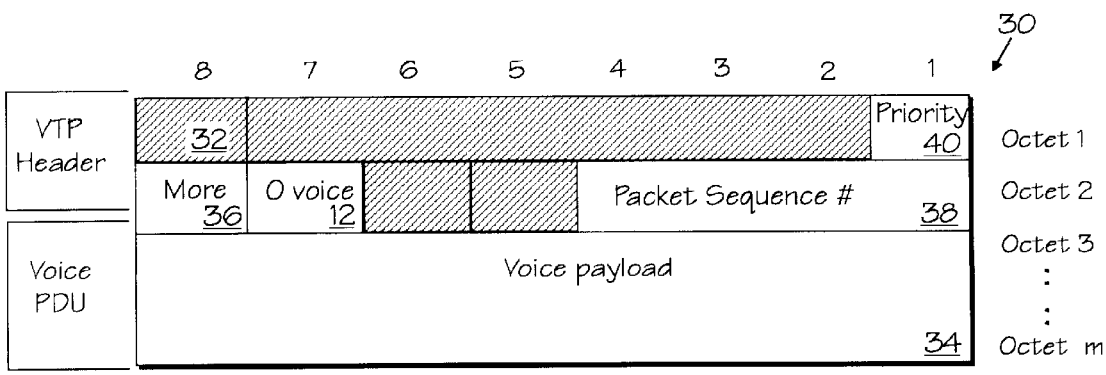
FIG. 5 illustrates a voice packet according to one embodiment.

A voice packet 30 provides for the transport of raw or compressed voice, fax or modem data between endpoints. It consists of the two octet voice transport protocol header 32 and a variable length payload field 34. FIG. 5 shows a typical voice packet 30.

Within the header 32, a more bit 36 indicates a continuous stream of voice packets, also referred to as a talk spurt. For a present embodiment, when the more bit 36 is set to zero, this indicates the last packet in a talk spurt (i.e., voice activity detection going active). When the more bit 36 is set to one, this indicates that additional voice packets 30 are to follow. For the case where the more bit 36 transitions to a zero to a one, this indicates the first packet of a talk spurt.

A packet sequence number field 38 is used to maintain temporal integrity of voice and signaling information as packets are being played out at the far end. For each new voice packet 30, the sequence number 38 is updated, modulo sixteen. For the coding rate selected, packets are accumulated at their nominal rate. At either end, the sequence number 38 is incremented for each packet interval. When voice activity detection is active, either end continues to increment its sequence number 38 at the nominal rate.

When voice activity detection is active, clocking skew between the endpoints dictate a synchronizing method. When voice activity detection is inactive, the sequence number field 38 may also be used for detection of loss or misinserted packets, or packets containing errored sequence numbers. The handling procedure may be application dependent, but some methods are presented in the following scenarios:

During extended speech gaps where voice activity detection is active, it is anticipated there will be a skew in the packet sequence number count at each end of the network. When speech again becomes active, the receiving end sequence number is resynchronized. An alternative is to use the signaling sum to keep the sequence numbers in sync during voice activity detection.

For lost voice packets, a packet arrives with a packet sequence number that falls outside of the expected range. That packet can be held, pending play out, while the next packet arrives. If the next packet's sequence number tracks after the suspect packet, then a timing baseline may be established due to a lost packet.

For misinserted packets, a packet arrives with a packet sequence number beyond the expected value. That packet can be held, pending play out, while the next packet arrives. If the next packet has the expected sequence number value, the suspect packet was misinserted and may be discarded.

For errored packets, a packet arrives with a packet sequence number beyond the expected value. That packet can be held, pending play out, while the next packet arrives. If the next packet has the expected sequence number value plus one, the suspect packet was errored and should be discarded.

A priority field 40 in the voice packet header 32 indicates to the lower layer protocol the relative importance of the packet's payload 34. This priority field 40 is only valid in the interface of voice transport protocol output to the link layer protocol, if used, and has no significance in transit, or on input to the voice transport protocol. This field may be useful for embedded compression algorithms, such as ITU-T Recommendation G.727, where the coder's core data is sent in a non-discardable packet, and enhancement data is sent in a discardable packet. For a present embodiment, when the priority field 40 is set to zero, the packet 30 is not discardable. When the priority field 40 is set to one, the packet 30 is discardable.

The voice transport protocol's voice packet payload 34 will contain encoded voice samples, demodulated fax/ modem data between endpoints or other information related to coding algorithms. Padding may be added in cases where voice packet payloads 34 do not fill the target segment 10 size.

Figure 6:
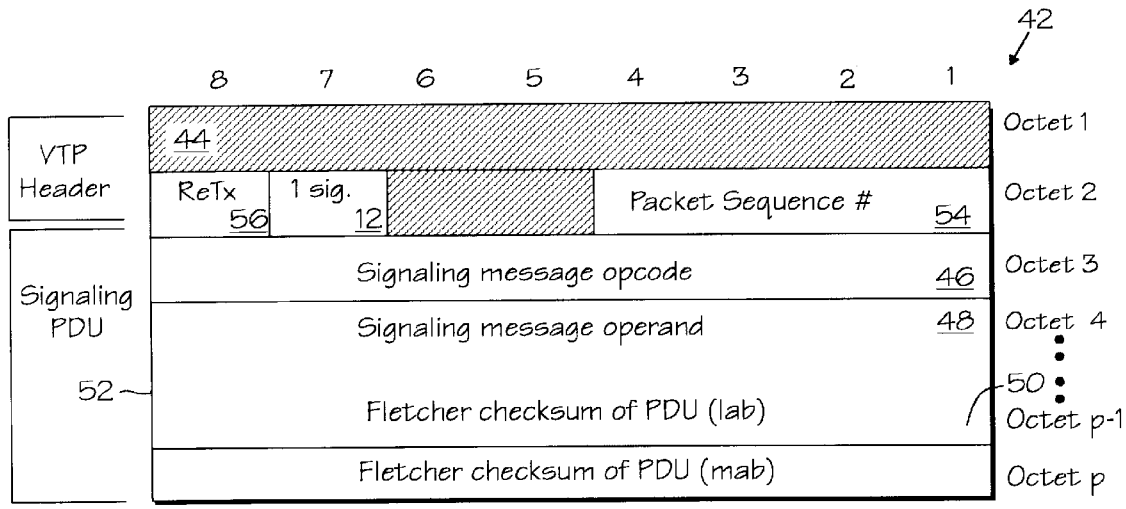
FIG. 6 illustrates a signaling packet according to one embodiment.

FIG. 6 shows signaling packet 42 which provides for the transport of transition signaling, status and link verification information between end points. Signaling packet 42 consists of a voice transport protocol header 44, signaling message opcode 46, variable length message operand 48, a checksum 50, and optional padding. Voice transport protocol signaling payloads 52 incorporate a robust message protocol for call set up information and a best effort method for status information. Signaling messages utilize the voice transport protocol's packet segmentation and reassembly procedures to support various segment sizes.

Within the signaling packet header 44, a packet sequence number 54 is used to synchronize a signaling transition to a packet 30 of voice data. When a signaling transition occurs, the packet sequence number 38 of the current voice packet 30 being assembled is placed on the signaling packet sequence number field 54. If a signaling packet 42 is received when a voice packet 30 is not present, as can he the case when voice activity detection is active or a voice packet is lost, then the end node's rolling voice packet sequence number 38 is utilized to recompute the appropriate play out time.

During call set up, voice activity detection and error conditions, some treatment of sequence numbers are necessary. The packet sequence number 54 is resynchronized during periods of time when voice activity detection is active and at call set up time through the use of status update messages (described further below). If, for whatever reason, a signaling packet 42 is received after the time indicated for play out, the signaling packet 42 is acted upon immediately. Since the lower level protocol guarantees no packets will be delivered out of order, any significant difference between signaling and voice packet sequence numbers will only be present if the signaling packet 42 was injected late, voice packets 30 are dropped or voice activity detection has been active for quite some time.

Signaling message transmission/retransmission procedure utilizes a status only and request-acknowledgment procedure. Once a message which requires an acknowledgment is sent, a time-out timer $T_{ra-timeout}$ is started. For one embodiment, $T_{ra-timeout}$ is 10 seconds. If no acknowledgment is received within this time period, the message is retransmitted. This cycle repeats every $N_{ra-retry}$ times. For one embodiment, this may be 4 times. If no response is received after $N_{ra-retry}$ times, the link will be considered invalid and the call state will be reset to inactive. It should be noted that request messages may be pending for a few different messages at any given time to speed call set-up time. This implies that each request-acknowledgment pair should have its own state machine and general timers. This also dictates that only one like-message may be sent at a time.

General status update messages known as "keep alive messages" will be sent every $T_{keep-alive}$ time period (1 second for one embodiment) to provide a link watchdog. Upon receipt of a status message, the watchdog timer will be reset. If the timer $T_{ra-timeout}$ expires, the link will be considered invalid and the call state will be reset to inactive.

Within the signaling packet header 44, a retransmit bit 56 indicates to the far end that the message is a retransmission of a previous request that went unacknowledged. If the protocol receives an unsolicited retransmit signaling packet 42, it should assume the first message was lost in the network and act upon the packet. If, while acting upon a request, the far end receives a retransmit for the same request (same sequence number 54 and relative time stamp), the far end should assume the acknowledgment was lost in the network and should resend the acknowledgment with its retransmit bit 56 set for diagnostic purposes.

Following is a description of signaling message opcodes and their related operands.

Figure 7:
FIG. 7 illustrates a Codings Supported Enquiry Message according to one embodiment.

A codings supported enquiry message (CSEM) is a request-acknowledge type message that contains a matrix of all the coding supported by the originating end system. Once the CSEM is sent, the Await CSAM (acknowledge) state is entered. FIG. 7 shows the format of a coding supported enquiry message 60. Each bit position in the Codings Supported Field 62 corresponds to a coding type as identified in Table 1. Octet four, bit one of the CSEM 60 is the least significant bit of the field, corresponding to code 00000000. Octet 36, bit eight, is the most significant bit of the field, corresponding to code 11111111. Presenting codings of different rates implies to the far end that the maximum rate may be selected and will not impact traffic of other users. A '1' in the appropriate location indicates to the far end that coding is supported.

TABLE 1

Coding Type Field

| Type Bits 54321 | Type Field 876 = 000 G.764 Types | Type Field 876 = 010 VTP Voice Types | Type Field 876 = 100 VTP Fax Types |
|---|---|---|---|
| 00000 | 8 bits/sample | 16K LD-CELP (G.728) | 14,400 BPS V.17 fax |
| 00001 | 7 bits/sample | 12K LD-CELP | 12,000 bps V.17 fax |
| 00010 | 6 bits/sample | 8K LD-CELP | 9600 V.17 fax |
| 00011 | 5 bits/sample | 8K CS-ACELP (G.729) | 7200 bps V.17 |
| 00100 | 4 bits/sample | | 300 bps V.21 fax |
| 00101 | 3 bits/sample | | 4800 bps V.27 ter fax |
| 00110 | 2 bits/sample | | 2400 bps V.27 ter fax |
| 00111 | 1 bits/sample | | 960 bps V.27 fax |
| 01000 | 8 bit A-law | | 7200 bps V.29 fax |
| 01001 | 8 bit u-law | | |
| 01010 | 2 bit ADPCM (G.726) | | |
| 01011 | 3 bit ADPCM (G.726) | | |
| 01100 | 4 bit ADPCM (G.726) | | |
| 01101 | 5 bit ADPCM (G.726) | | |
| 01110 | Reserved | | |
| 01111 | Reserved | | |
| 10000 | Reserved | | |
| 10001 | Reserved | | |
| 10010 | Reserved | | |
| 10011 | Reserved | | |
| 10100 | 4,2 ADPCM | | |
| 10101 | 5,2 ADPCM | | |
| 10110 | Reserved | | |
| 10111 | Reserved | | |
| 11000 | 8,6 ADPCM (G.722) | | |
| 11001 | Reserved | | |
| 11010 | Reserved | | |
| 11011 | Reserved | | |
| 11100 | Reserved | | |
| 11101 | Reserved | | |
| 11110 | Reserved | | |
| 11111 | Reserved | | |

Figure 8:
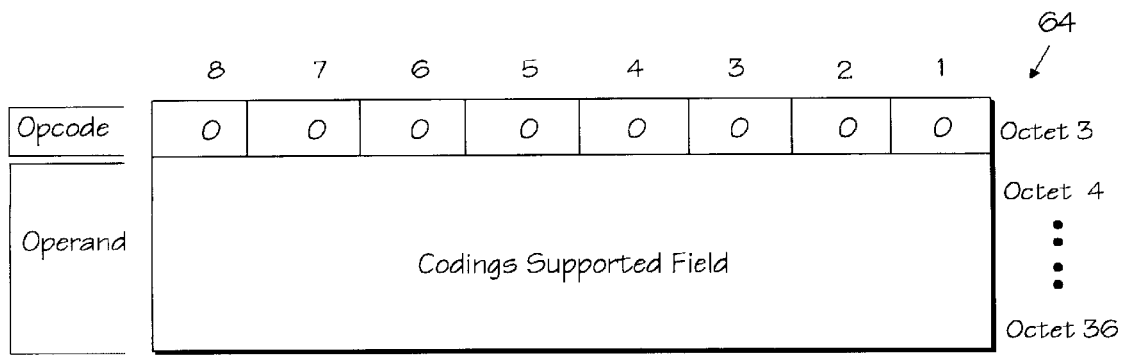
FIG. 8 illustrates a Codings Supported Acknowledge Message according to one embodiment.

A codings supported acknowledge message (CSAM) is a status type message which is sent in to a CSEM 60. Each CSAM contains a matrix of all the coding supported by the terminating er system. Once a CSAM is received in response to a CSEM, the originating end analyzes the data and cho a preferred coding, it supported, via a coding change message. FIG. 8 shows the format of a codings supported acknowledge message 64.

A coding change message (CCM) is a request-acknowledge message which informs the other end to change to a preferred coding type. The format of a coding change message 66 is shown in FIG. 9. Once a CCM 66 is sent an Await CCAM state is entered. Once the link is up and running, the coding type information appears in a voice coding type field of a status update message.

A coding change acknowledge message (CCAM) is a status message sent in response to a CCM 66. The format for a coding change acknowledge message 68 is shown in FIG. 10. The message is a confirmation that a change to the preferred coding type has been performed. Once the CCAM message 68 is received, a call active state is entered and voice data may flow. The coding change acknowledge message 68 is required to avoid problems resulting from glare conditions in permanent virtual circuit applications. During glare, each end originating a call may send a coding change acknowledge message 68. If the coding type field received is the same as was sent in the CCM, then that end may send packetized voice. If the field is different, the negotiation starts again. If after $N_{recode-retry}$ attempts there is still a mismatch, then the link is declared invalid. The current coding type field 69 corresponds to a coding type as identified in Table 1.

Status update messages (SUM) are status messages which are sent when the message content changes, or every keep alive period, $T_{keep-alive}$, as a keep alive message. The status update message is also used to synchronize the packet sequence number at call set up time and during sections of speech inactivity. Care should be utilized in dimensioning bandwidth when using the transition signaling method to convey Dial Pulse addressing. When sending transition based addressing such as winks and dial pulses, the application may opt to send status update messages more often to compensate for errored or lost packets. The format of a status update message 70 is shown in FIG. 11.

Status update message (SUM) 70 includes a relative transition time field 72. This field relates to the play out of a signaling transition to the far end, relative to the beginning of play out of its associated voice packet 30. Relative transition time field 72, with the support of the packet sequence number field 54, helps to maintain temporal integrity of signaling. When a signaling transition occurs, the time of the transition event relative to the stall of the current voice packet assembly in two microsecond intervals is placed in the relative transition time field 72. A present embodiment uses a relevant transition time field 72 set to 0 to indicate immediate transition and is used for keep alive messages. The field is set to 1 to indicate 2 milliseconds from the start of the current packet assembly. The field is set to 255 to indicate 512 milliseconds from the start of current packet assembly.

The status update message 70 also includes a signaling condition type field 74 which provides configuration information for the far end node. This may be useful for protocol spoofing algorithms or node management. Table 2 lists the signaling condition type information and bit patterns.

TABLE 2

Signaling Conditioning Type Field

| bits 8765 4321 | Signaling Conditioning Type |
|---|---|
| 0000 0000 | Voice only |
| 0000 0001 | FXO loop start |
| 0000 0010 | FXO ground start |
| 0000 0011 | FXS loop start |
| 0000 0100 | FSX ground start |
| 0000 0101 | PLAR |
| 0000 0110 | Office Loop Reverse Battery Signaling |
| 0000 0111 | Station Loop Reverse Battery Signaling |
| 0000 1000 | E & M Wink Start |
| 0000 1001 | E & M Delay Dial |
| 0000 1011 | E & M Immediate Start |

TABLE 2-continued

Signaling Conditioning Type Field

| bits 8765 4321 | Signaling Conditioning Type |
|---|---|
| 0000 1100 | SF Wink Start |
| 0000 1101 | SF Delay Dial |
| 0000 1111 | SF Immediate Start |
| 0001 0000 | RR Signaling |
| others | Reserved |
| 1111 1111 | Common Channel (e.g.,ISDN, BISDN, etc.) Signaling (processed externally to VTP) |

The voice activity detection field (VAD) 76 of the SUM 70 indicates to the far end whether voice activity detection is supported on the sending end. Both ends must agree as to whether voice activity detection is supported. If either end has voice activity detection disabled, then voice activity detection cannot be used. The voice activity detection field is interpreted as shown in Table 3.

TABLE 3

VAD Field States

| VAD (Near-end) | VAD (Far-end) | Interpretation |
|---|---|---|
| 0 | 0 | VAD not supported |
| 0 | 1 | VAD supported at far-end but not at near-end; VAD will not be enabled. |
| 1 | 0 | VAD supported at near-end but not at far-end; VAD will not be enabled. |
| 1 | 1 | VAD supported and may be utilized. |

The origination field 78 of the status update message 70 indicates where the call originated. Intended for the detection of glare, it is provided as a tool for protocol spoofing applications. The origination field 78 is interpreted as shown in Table 4.

TABLE 4

Originating Field States

| Call Origin | Interpretation |
|---|---|
| 0 | Call terminating end. |
| 1 | Call originating end. |

The dial digit conditioning type field 80 of the status update message 70 indicates the type of addressing conditioning supported. Table 5 lists the various dial digit types.

TABLE 5

Dial Digit Types

| Bits 4321 | Dial Digit Conditioning Type |
|---|---|
| 0000 | Voice only |
| 0001 | Metallic dial pulse |
| 0010 | DTMF |
| 0011 | MF |
| 0100 | SF dial pulse |
| 0101 | R2 signaling dial pulse |
| 0110–1110 | Reserved |
| 1111 | Common channel (IE: Not via VTP) (ISDN, B-ISDN, etc. |

The voice coding type field 82 of the status update message 70 indicates the method of encoding speech samples at the originating endpoint before packetization. The originating end system only encodes algorithms for which there is decode support at the terminating end system. The coding types for the voice transport protocol were presented above in Table 1.

The noise amplitude field 84 of the status update message 70 indicates the background noise amplitude. To the receiver, it indicates the noise level to play out during voice activity detection gaps in packet delivery. Table 6 shows the noise amplitude coding supported by voice transport protocol.

TABLE 6

Noise Amplitude Coding

| bits 4321 | Noise Amplitude (dBmc0) |
|---|---|
| 0000 | Idle |
| 0001 | 16.6 |
| 0010 | 19.7 |
| 0011 | 22.6 |
| 0100 | 24.9 |
| 0101 | 26.9 |
| 0110 | 29.0 |
| 0111 | 31.0 |
| 1000 | 32.8 |
| 1001 | 34.6 |
| 1010 | 36.2 |
| 1011 | 37.9 |
| 1100 | 39.7 |
| 1101 | 41.6 |
| 1110 | 43.8 |
| 1111 | 46.6 |

The out-of-band signaling condition field (ABCD) 86 is used for PVC applications where addressing protocol spoofing is not utilized. This field carries a representation of the out-of-band signaling information to a like configured interface when there is a state change. In PVC applications where address protocol spoofing is used, ABCD bits and/or the in-band signaling condition field 88 convey connect and disconnect information. In the case of SVC links, field 86 is ignored.

The in-band signaling condition field 86 of the status update message 70 carries a representation of the in-band (trunk) signaling information when there is a state change. Table 7 shows the in-band signaling condition coding used by the voice transport protocol.

TABLE 7

In-band Signaling Condition Coding

| bits 8765 4321 | |
|---|---|
| | DTMF Codes |
| 0000 0000–0000 1101 | DTMF digits 0–9, A–D |
| 0000 1110 | DTMF* |
| 0000 1111 | DTMF# |
| | MF Codes |
| 0001 0000–0001 1111 | MF Digits |
| | SF Codes |
| 0010 0000 | 1700 Hz echo protect tone |
| 0010 0001 | 1800 Hz echo protect tone |
| 0010 0010 | 2713 Hz loop-back tone |
| 0010 0011 | 2813 Hz loop-back tone |
| 0010 0100–0010 1111 | Reserved |

TABLE 7-continued

In-band Signaling Condition Coding

| bits 8765 4321 | |
|---|---|
| | Call Progress Codes |
| 0100 0000 | Busy Signal |
| 0100 0001 | Ring-back |
| 0100 0010 | Congestion |
| 0100 0011 | Dial-tone |
| 0100 0100 | Dial-tone 2 |
| 0100 0101 | Out of Service |
| 0100 0110 | Address Acknowledge |
| 0100 0111 | Disconnect |
| 0100 1000 | Off-hook Notice |
| 0100 1001 | Off-hook Alert |
| 0100 1010–1111 1110 | Reserved Inactive Code |
| 1111 1111 | No action (tone off) |

A dial digit forwarding message is sent for applications of SVCs and protocol spoofing PVCs. Digit sequences provided by the end user are filtered, and the remaining digits are passed to the far end via a dial digit forwarding message for regeneration. FIG. 12 shows the format of a dial digit forwarding message 90. When a dial digit forwarding message 90 is sent, an Await DDAM state and an addressing incomplete state are entered. Dial digit codes are listed in Table 8. If a dial digit acknowledge message is not received within the time-out period, the dial digit forwarding message 90 is resent.

TABLE 8

| Bits | Dial Digits |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |
| 1101 | D |
| 1110 | * |
| 1111 | # |

A dial digit acknowledge message 92, an example of which is shown in FIG. 13, is sent in response to the receipt of a dial digit forward message 90. Upon receipt of DDAM 92, an Await DCM state is entered. The time-out period of this state may be implemented as a function depending on the number of digits forwarded.

A dialing complete message (DCM) is sent when DDFM 90 dialing is complete. The format of a dialing complete message 94 is shown in FIG. 14. When sent, the Await DCM state is entered.

A dialing complete acknowledge message (DCAM) is sent when a DCM 94 is received. When a DCAM is received, the addressing complete state is set. FIG. 15 shows the format of a dialing complete acknowledge message 96. A call progress tone message (CPTM) is a status type message used to provide localization of far-end call progress tones to the calling party without the need to use bandwidth for voice data in protocol spoofing or SVC applications during call set up. The call progress tone message sent by the far-end provides information on dial-tone sequences of multiple cadenced states for local play out. For each tone segment in a cadence, the operand structure is repeated up to four times. FIG. 16 shows the format of a call progress tone message 100.

When a call progress tone message 100 is received, the indicated tone is to be played out to the user. Tone generation continues until (a) another CPTM 100 arrives, indicating a new tone sequence is to be generated; (b) the circuit is determined to be active, at which point voice data takes over; (c) the channel is placed in the inactive state; or (d) the status update message 70 is received where the in-band signaling condition 88 indicates tone off.

Figure 17:
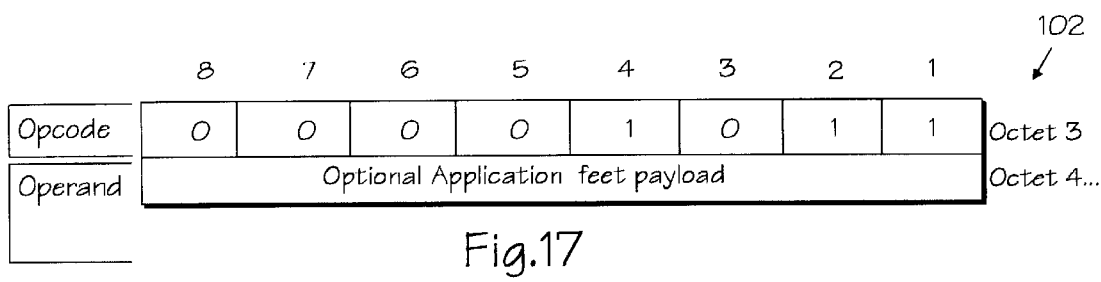
FIG. 17 illustrates a Transport Ping Message according to one embodiment.

A transport ping message 102 is a request-acknowledge message that may be sent as a link state test message for diagnostics or from either end-point to determine end-to-end delay. Transport ping message (TPM) 102 may support an optional payload of ping sequence numbers, data bits, test patterns, etc., which the far end loops back in a transport ping acknowledge message. FIG. 17 shows the format of a transport ping message 102.

Figure 18:
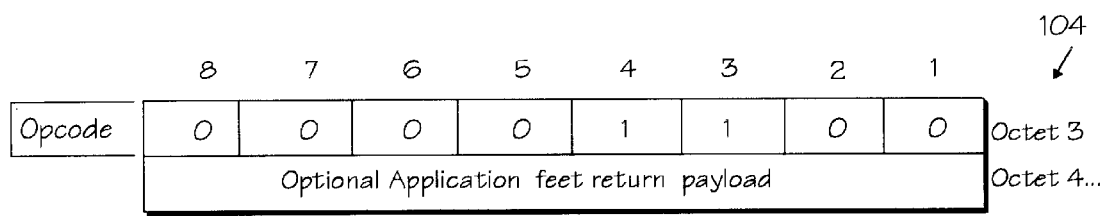
FIG. 18 illustrates a Transport Ping Acknowledge Message according to one embodiment.

A transport ping acknowledge message 104 is a status message sent immediately in response to a TPM 102. FIG. 18 shows the format for a transport ping acknowledge message (TPAM) 104. This is intended to be a low level function, where the message content is turned around with little modification. That is, only the opcode and check-sum is changed. Any payload is looped back unmodified.

The Fletcher check sum field 50 of the signaling packet 42 of FIG. 6 provides signaling packet protection from bit and block errors during transport over unprotected networks, such as ATM. The checksum is computed from octet 3 to the end of the message operand (across segment boundaries, if necessary), and appended. The Fletcher check sum provides error protection capabilities similar to a CRC.

The signaling packet payload 52 will contain status and signaling information necessary for end-point function negotiation, end user signal passing, and maintenance. Since the minimum unit of data is considered to be a voice transport protocol segment 10, the encapsulated transport method is utilized wherever possible.

Figure 19:
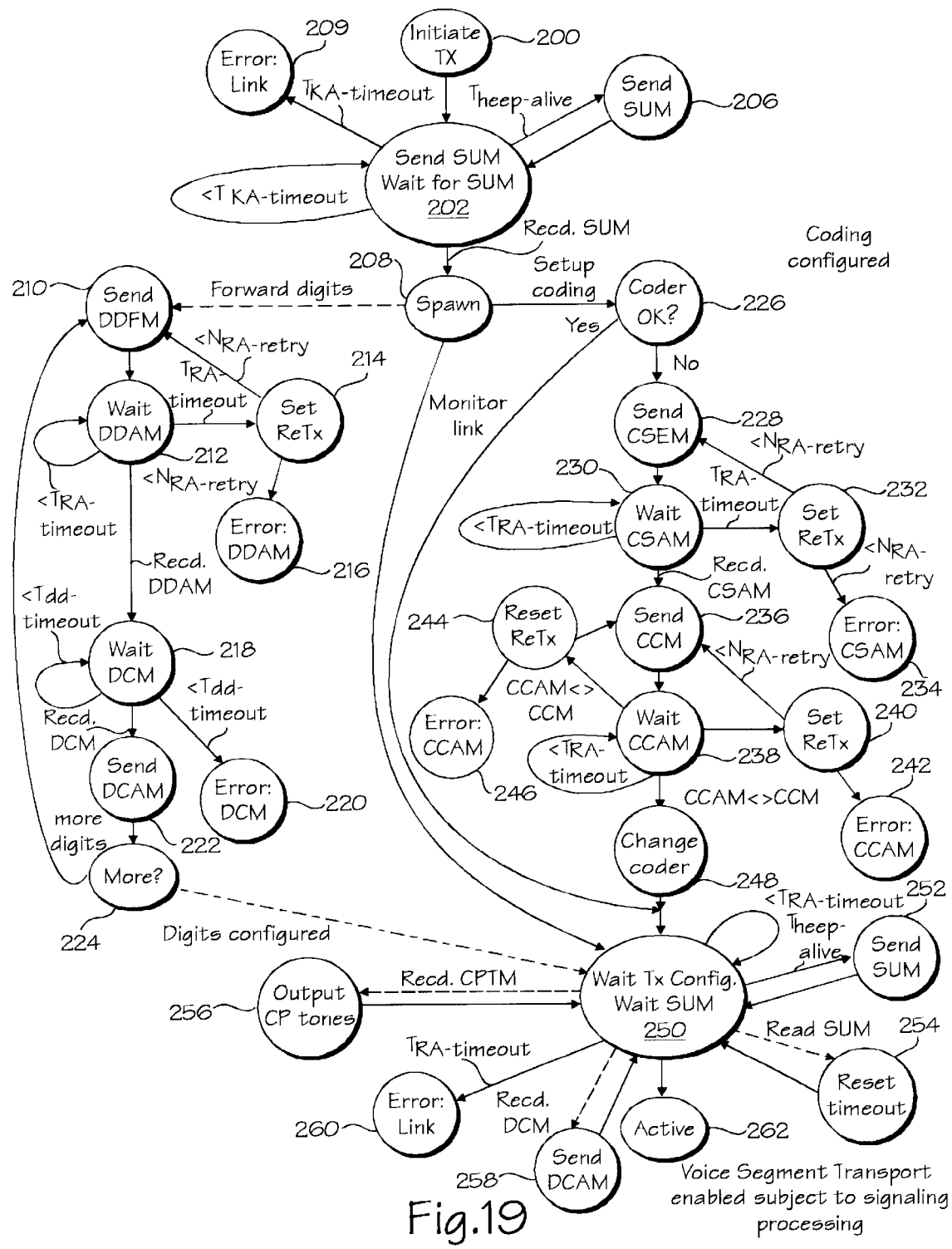
FIG. 19 is a state diagram showing the various states experienced in a voice transport protocol according to one embodiment for call initialization when initiating a call.

FIG. 19 illustrates to the various states experienced by the voice transport protocol during call initialization when initiating a call. The process begins at state 200 when a transmission is initiated. During call initialization, the VTP moves to state 202 where a status update message is sent. Status update message are used to synchronize the packet sequence numbers at call set up and are also sent every period $T_{keep-alive}$ as a keep alive message. If timer $T_{ra-timeout}$ times out before a status update message is received, the VTP moves to state 204 and an error condition is reported. Otherwise, the VTP moves to state 206, and a status update message is sent. When a status update message has been received, the VTP moves to state 208.

For applications involving switched virtual circuits and protocol spoofing permanent virtual circuits, the VTP moves to state 210 where a dial digit forwarding message 90 is sent. After sending the dial digit forwarding message 90 the VTP moves to state 212 to await a dial digit acknowledge message 92. If timer $T_{ra-timeout}$ (10 seconds for one embodiment) times out during the Await DSAM state 212, the VTP moves to state 214 to determine whether to retransmit the dial digit forwarding message 90. If more than $N_{RA-retry}$ transmissions have already been attempted (4 attempts for one embodiment), error condition 216 is reported. Otherwise, VTP retransmits the DDFM 90. When a DDAM 92 has been received, the VTP enters state 218 to await a dialing complete message 94. The dialing complete message 99 is sent when dialing is complete. When the DCM 94 is sent, the send DCEM state 222 is entered. If the dialing complete message 94 is not sent within a time-out period $T_{dd-timeout}$, an error condition is set at state 220. For one embodiment, $T_{dd-timeout}$=(10 sec +# of digits * 1 sec). The dialog and complete acknowledge message 96 is sent at step 222 when the DCM 94 is received. At this point, the addressing complete state is set. The VTP, then moves to state 224 to determine if more dialog digits need to be forward.

From state 208, the VTP also needs to set up the proper coding for the transmission session. Hence, the VTP enters state 226 to determine if the transmit and receive codings agree. If so, the VTP moves to a wait state 250 otherwise, the VTP sends step codings supported enquiry message 60 at step 228. The CSEM 60 contains a matrix of all the codings supported by the originating end system. Once the CSEM 60 is sent, the Await CSAM state 230 is entered. If a CSAM 64 is not received within a $T_{RA-timeout}$, time-out period, (10 sec) the VTP enters state 232 to determine whether to retransmit the CSEM 60. If not, i.e., if $N_{ra-retry}$ (4) retransmissions have already been made, an error condition is set at step 234. Otherwise the CSEM 60 message is retransmitted.

Once a CSAM 64 has been received, the VTP moves to step 236 where a coding change message 66 is sent. The coding change message 66 informs the other end to change to a preferred coding type. Once sent, the Await CCAM state 238 is entered.

While waiting for a CCAM 68, if timer $T_{RA-timeout}$ times out, the VTP moves to step 240 to determine whether to retransmit the CCM 66. If the CCM has already been sent $N_{ra-retry}$ times (4 times), an error condition is set at step 242. If not, the CCM 66 is retransmitted. If the received CCAM 68 is not the same as the CCM 66, the VTP enters state 244 to determine whether to repeat the above process. If the error condition is present the VTP moves to step 246 to report the error message otherwise, the CCM 66 is retransmitted.

Once the CCAM 68 has been received such that the coding type field received is the same as was sent in the CCM 66, the coding is changed at step 248. After the coding has been set, the VTP moves to state 250.

While awaiting transmission configuration at step 250, status update messages 70 are sent each keep alive period at step 252. When a status update message 70 is received, the timer $T_{RA-timeout}$ (10 sec) is reset at step 254.

While the transmission end is being configured, call progress tones are sent at step 256. These tones are transmitted as call progress tone messages 100.

If the time-out timer $T_{RA-timeout}$ (10 sec) expires without a status update message 70 having been received, an error condition is reported at step 260. Once the transmission end has been configured, the VTP moves into the active call state at step 262.

Figure 20:
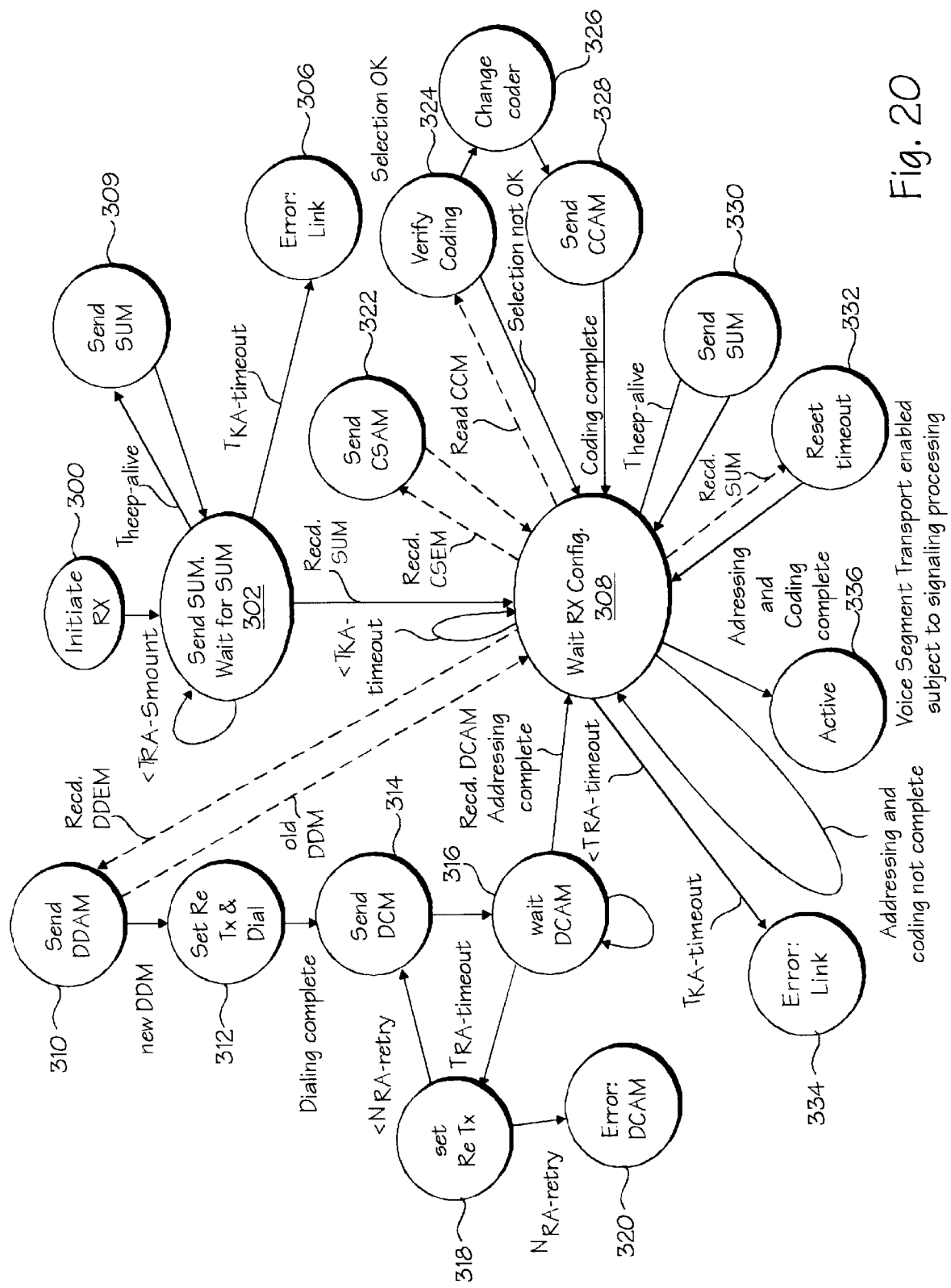
FIG. 20 is a state diagram illustrating the various states experienced in a voice transport protocol according to one embodiment for call initialization when receiving a call.

FIG. 20 provides a reference to the various states experienced in VTP duiing call initialization when receiving a call. The process begins at step 300 where the receive state is initiated. From step 300 the VTP moves to step 302 where status update messages 70 are sent every keep alive period as shown in step 304. If the timer $T_{RA-timeout}$ times out (10 sec) before receipt of a status update message 70, an error condition is reported at step 306.

When a status update message 70 has been received, the VTP moves to step 308 while the receive end is being configured. Upon receipt of a dial digit forwarding message 90, the VTP enters state 310 where a dial digit acknowledge message 92 is sent. From state 310, the VTP moves to state 312 where dialing is performed. When dialing has been completed, the VTP moves to state 314 where a dial complete message 94 is sent.

Once the DCM 94 has been sent, the VTP awaits a dialing complete acknowledge message 96 at step 316. If no DCAM 96 is received within a time-out period, $T_{RA-timeout}$, the VTP moves to step 318 to determine if an error has occurred. If an error has occurred, i.e., if DCM 94 has been sent more than $N_{RA-retry}$ times (4), the VTP reports the error at step 320. Otherwise, the VTP retransmits the DCM 94 at step 314.

While the receive end is being configured, upon receipt of a codings status enquiry message 60, a coding supported acknowledge message 64 is sent at step 322. If a CCM 66 is received, the VTP moves to step 324 to verify the coding. If the coding selection is proper, the VTP moves to step 326 to change the coding. When the coding has been changed, the process moves to step 328 and a CCAM 68 is transmitted.

While the receive end is being configured, status update messages 70 are sent every keep alive period. As indicated in step 330 each time a status update message 70 is received, the reset timer $T_{RA-timeout}$ (10 sec) is reset as shown in step 332. If the timer times out, an error condition is reported at step 334. Once the address and coding have been completed, the VTP moves to the active state.

Figure 21:
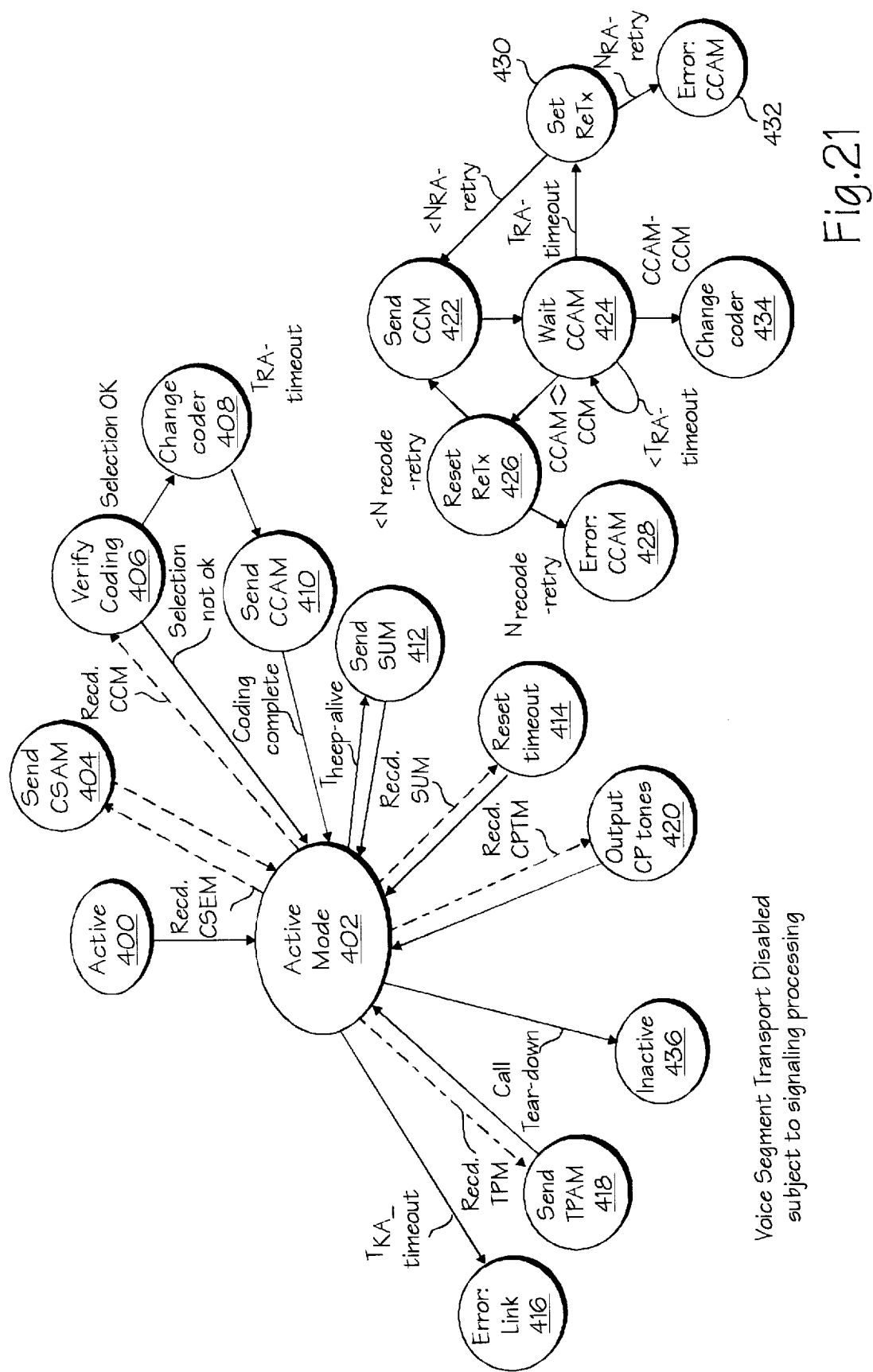
FIG. 21 is a state diagram showing the various states experienced in a voice transport protocol according to one embodiment during a call active state.

FIG. 21 shows the various states experienced in the voice transport protocol during the call active state. The active state is entered at step 400 and the VTP moves to state 402, the active mode.

While in the active mode, it a CSEM 60 is received, the VTP enters state 404 and a CSAM 64 is sent.

If, while in the active mode, a CCM 66 is received, the VTP enters state 406 to verify the coding. If the coding selection is proper, the VTP process moves to state 408 where the coder is changed. Next, the VTP enters state 410 and a CCAM 68 is sent.

While in the active mode, status update messages 70 are sent every keep alive period as shown in step 412. Each time a status update message 70 is received, the reset timer $T_{RA-timeout}$ (10 sec) is reset as shown in step 414. If the keep-alive timer times out while in the active mode an error condition is reported at step 416.

While in the active mode, if a transport ping message 102 is received, a transport ping acknowledge message 104 will he returned at step 418. If a CPTM 100 is received, the VTP enters state 420 where call progress tones are output.

If a CCM 66 is sent at step 422, the VTP enters state 424 to await a CCAM 68. If a CCAM 68 is returned that is not equal to the CCM 66, the VTP enters state 426 to determine if an error has resulted. If an error is present, i.e., if more than $N_{RA-retry}$ (4) CCM 66 messages have been sent, the VTP enters state 428 to report the error condition. Otherwise, the CCM 66 is retransmitted.

If, while awaiting the CCAM 68 the time-out timer $T_{RA-timeout}$ (10 sec) expires the VTP enters state 430 to determine it an error has occurred. If so, i.e., if the CCM 66 has been sent $N_{RA-retry}$ times, the VTP enters state 432 and the error condition is reported. Otherwise, the CCM 66 is retransmitted.

If the received CCAM 68 is equal to the CCM 66, the VTP enters state 434 and the coder is changed.

When the call is complete, the VTP enters the inactive mode 436. At this point, voice segment transport is disabled.

Thus, a transport layer protocol for compressed voice, facsimile and modem data has been described. In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A transport layer protocol comprising:

a packetization sublayer configured to accept voice, compressed voice, facsimile or modem data from a user application and to produce data packets therefrom, the packetization sublayer further configured to accept signaling information relating to the voice, compressed voice, facsimile or modem data and to produce signaling packets therefrom only upon signaling transitions; and a payload segmentation sublayer configured to generate fixed length cells from the data and signaling packets, each cell comprising a header and a payload.

2. The transport layer protocol of claim 1 wherein each header comprises an information field specifying the contents of the payload.

3. The transport layer protocol of claim 2 wherein each header further comprises a packet sequence number specifying a temporal position of an associated payload in a sequence of cells.

4. The transport layer protocol of claim 3 wherein each header further comprises a priority field specifying a priority of the associated cell.

5. The transport layer protocol of claim 1 wherein each payload of a cell generated from one or more signaling packets includes a signaling message identification code (op code) and a signaling message (operand).

6. The transport layer protocol of claim 5 wherein the signaling message is chosen from the group consisting of a coding supported enquiry message, a coding supported acknowledge message, a coding change message, a coding change acknowledge message, a status update message, a dial digit forwarding message, a dial digit acknowledge message, a dialing complete message, a dialing complete acknowledge message, a call progress tone message, and a transport ping message.

7. The transport layer protocol of claim 6 wherein the status update message comprises a relative transition time field specifying a temporal relation between a signaling message and a voice packet.

8. The transport layer protocol of claim 7 wherein the status update message further comprises a signaling condition type field specifying configuration information for a network node which receives the signaling message.

9. The transport layer protocol of claim 8 wherein the status update message further comprises a voice coding type field specifying a method of encoding speech samples for data packets which include voice data.

10. The transport layer protocol of claim 6 wherein the status update message includes a signaling condition field.

11. The transport layer protocol of claim 10 wherein the signaling condition field is an out-of-band signaling condition field.

12. The transport layer protocol of claim 10 wherein the signaling condition field is an in-band signaling condition field.

* * * * *